R. W. SAMPSON.
TIRE TOOL.
APPLICATION FILED OCT. 15, 1913.
1,136,977.
Patented Apr. 27, 1915.
Fig. 1
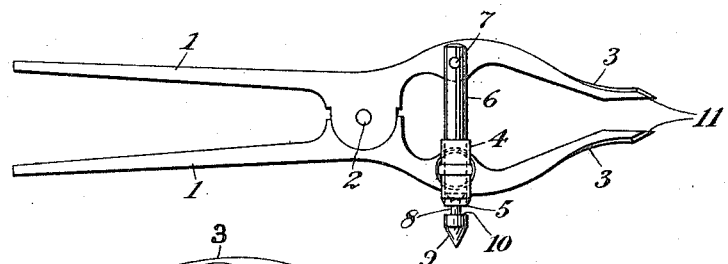
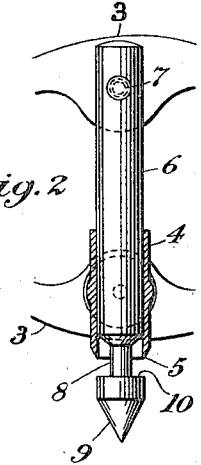
Fig. 2
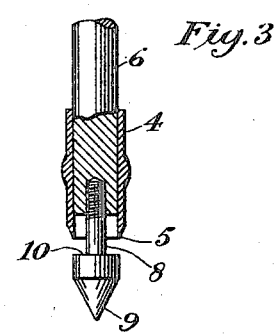
Fig. 3
Fig. 4
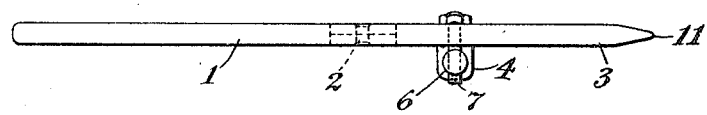
Witnesses:
Chas. D. King.
Agnes Gerhauser.
Inventor:
Robert W. Sampson,
by Andrew Wilson,
Attorney.

UNITED STATES PATENT OFFICE.

ROBERT WILLIAM SAMPSON, OF WESTMOUNT, QUEBEC, CANADA.

TIRE-TOOL.

1,136,977.　　　　Specification of Letters Patent.　　Patented Apr. 27, 1915.

Application filed October 15, 1913. Serial No. 795,245.

*To all whom it may concern:*

Be it known that I, ROBERT WILLIAM SAMPSON, a subject of the King of Great Britain, residing at Westmount, in the Province of Quebec and Dominion of Canada, have invented certain new and useful Improvements in Tire-Tools, of which the following is a specification.

My invention relates to a tool for use in inserting plugs into punctures in pneumatic tires or similar articles formed of elastic material, and my improvements are directed particularly to the means for preparing the puncture to receive the plug and for facilitating the insertion of the plug into the puncture.

When a puncture or small hole is formed in an elastic body, for instance in the inner tube of a double tube pneumatic tire, it becomes important, in order to insert a plug or closer without tearing and further rupturing the puncture, to give to the opening a regular contour, preferably circular, with no rents or tears extending outward therefrom into the body of the tire. Such an opening may be stretched considerably, without danger of its tearing. And when so stretched the head of a plug may be slipped through the opening which may afterward be allowed to contract before the plug is secured in its final position. Means therefore should be provided for forming a smooth and regular opening and for suitably expanding that opening. And it is for securing those means that I have devised my improved tire tool.

In the drawings Figure 1 is a side view of one of my tools; Fig. 2 is an enlarged view, partly in section, of its hole-cutting elements; Fig. 3 is a view partly in section of a modification of the hole-cutter; and Fig. 4 is an edge view taken from above on Fig. 1.

Similar reference numerals designate similar parts in all the figures.

A pair of handles 1, 1 are pivoted together at 2 and are extended into tapering jaws 3, 3, to one of the jaws is pivoted a sleeve 4 by means of an extension 12 passing therethrough and headed or secured by a nut on its opposite side and provided with a cutting edge 5. And through this sleeve 4 slides a shaft 6 which is attached by a pivot 7 to the other jaw 3. At its opposite end the shaft 6 is provided with a reduced neck 8 beyond which projects a conical head 9, having a flat base 10 which is adapted to make a cutting or shearing connection with the sharp edge 5 of the sleeve 4. By this arrangement, when the handles 1, 1 are separated the jaws 3, 3 will be moved toward each other and the shaft 6 will be projected down through the sleeve 4. And when the handles 1, 1 are pressed toward each other the shaft 6 will be drawn up through the sleeve 4, the adjustment of the parts being such that the head 9 of the shaft will pass up into the sleeve 4 before the handles 1, 1 meet.

The forward ends of the jaws 3, 3 are preferably pointed or tapered off as shown at 11, 11; so that when they are brought together they may be readily inserted into an opening of the size of the opening in the sleeve 4. The pivoting of the sleeve 4 to one of the jaws 3 and of the end of the shaft 6 to the other jaw 3 permits the coöperating cutting edge 5 and the head 9 to accurately coöperate with each other, notwithstanding the swinging movements of the pivoted jaws 3, 3 in opening and closing. And the ends of the jaws 3, 3 are also so formed that as they are separated, by the pressing together of the handles 1, 1, they will diverge one from the other so as to prevent any flexible material which may surround them from readily slipping off.

My device may be used as follows:—The handles of the tool being opened, the head 9 will be projected out of the sleeve 4, and may be readily thrust through a puncture in the inner tube of a pneumatic tire, the elastic material of the tire closing in again around the neck 8. When the handles 1, 1 are then pressed together the shaft 6 will be drawn up through the sleeve 4 and the back of the head 9 will press the material of the tire against the cutting edge 5 of the sleeve 4 with the result that a clean smooth hole will be sheared through the material, the separated piece being pushed up into the sleeve 4. The handles of the tool are again separated, incidentally projecting the head 9 from the sleeve 4 and permitting the removal of the piece of waste material from around the neck 8, and bringing together the points of the jaws 3, 3, which are then inserted into the hole which has been cut in the tire as above described. The handles 1, 1 are pressed toward each other with the result that the opening in the tire will be stretched between the jaws 3, 3 but not sufficiently to tear or rupture it, the parts of the tool being preferably so proportioned that the handles will come together or their movement will be automatically checked before the jaws have opened so wide as to endanger the integrity of the tire. The head of the plug or closer may then be inserted through the opening in the tire, which may then be allowed to contract by closing the jaws 3, 3 of the tool and withdrawing them from the aperture, and the plug may be permanently secured in place by cementing or clamping as may be appropriate to its character.

In Fig. 3 I have shown a modification wherein the head 9 is not made integral with the shaft 6 but is attached thereto by means of a screw thread upon the extended end of its neck 8; and other modifications may be made in the details of construction without departing from the spirit of my invention.

Having thus described my invention what I claim and desire to secure by Letters Patent of the United States is:—

1. In a tire-tool, the combination of a pair of pivoted jaws, a sleeve-guide provided with a cutting edge pivoted to one jaw and a plunger pivoted to the other jaw and passing through said guide and being provided with a cutting edge coöperating with the cutting edge of said sleeve-guide.

2. In a tire-tool, the combination of a pair of pivoted handles provided with projected, tapered meeting ends or jaws adapted to be spread by the closing together of the handles, a tubular cutter pivoted to one jaw and a coöperating plunger pivoted to the other jaw and provided with a head adapted to shear interiorly past the edge of said tubular cutter, said head being of a diameter adapted to form a hole in a flexible tire suitable to receive the closed jaw-ends.

ROBERT WILLIAM SAMPSON.

Witnesses:
  HOWARD M. ROWE,
  AGNES GERHAUSER.

Copies of this patent may be obtained for five cents each, by addressing the "Commissioner of Patents, Washington, D. C."